June 27, 1950  D. C. WARREN  2,512,883
SWIVEL JOINT FOR HANDLING STEAM OR THE LIKE
Filed Dec. 3, 1945
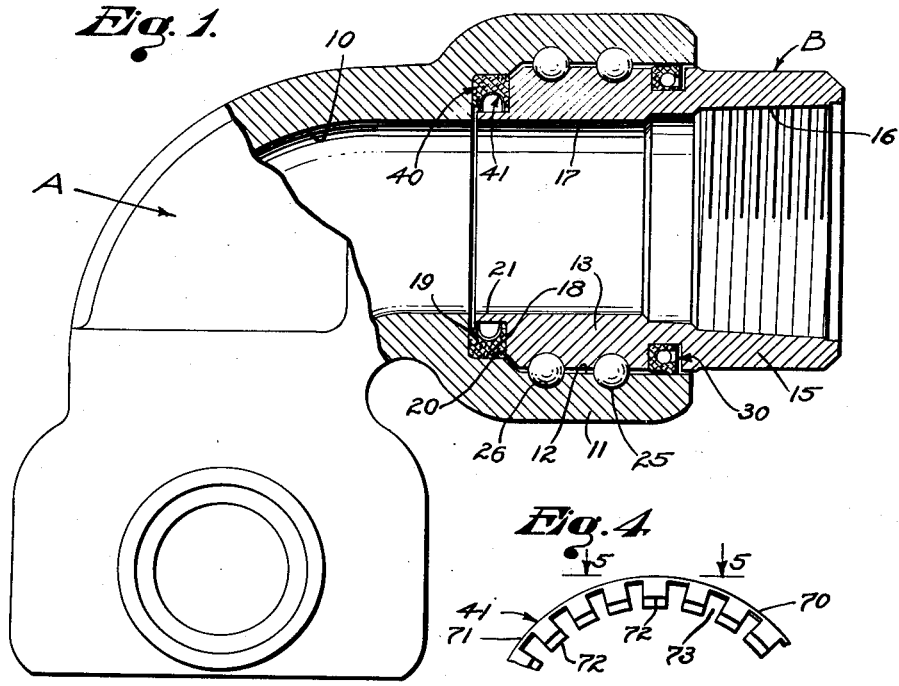
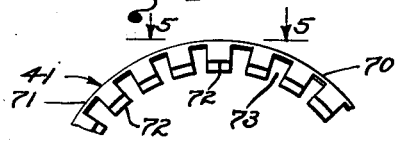
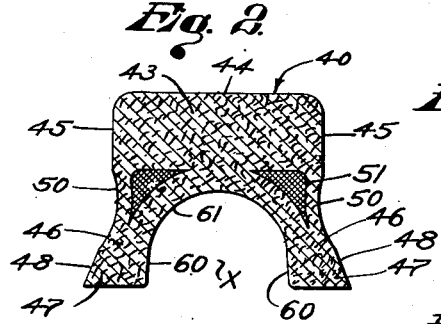
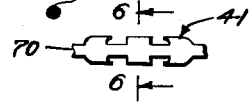
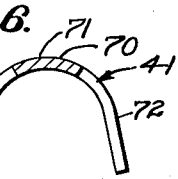
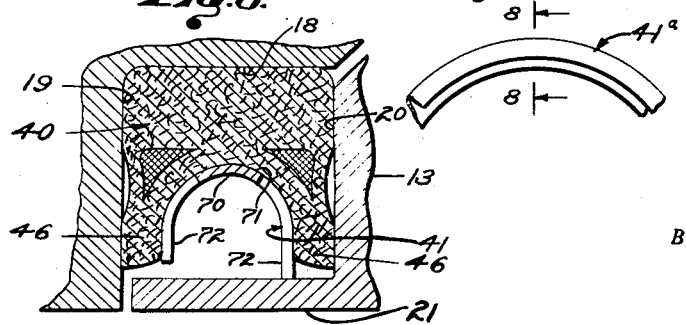
INVENTOR.
Doyle C. Warren
BY
Attorney Patented June 27, 1950

2,512,883

UNITED STATES PATENT OFFICE 2,512,883

SWIVEL JOINT FOR HANDLING STEAM OR THE LIKE

Doyle C. Warren, Monrovia, Calif., assignor to Chiksan Company, Brea, Calif., a corporation of California Application December 3, 1945, Serial No. 632,568

5 Claims. (Cl. 285—97.3)

1

This invention has to do with a joint and packing for effectively and dependably handling steam, or like hot fluids, and it is a general object of the invention to provide a joint and packing that is simple and inexpensive of manufacture, convenient to install and replace when necessary, and which is effective and dependable in operation.

Steam and like hot fluids are generally difficult to handle where swivel or working joints are required. As a general rule materials that most effectively resist heat are not resilient or possessed of characteristics that make them effective for sealing against leaks, whereas rubber and like materials that make good seals do not withstand high temperatures.

A general object of my present invention is to provide a joint in which there is a continuous annular sealing ring, which ring is of heat resisting material and includes a resilient element that effectively holds such material in sealing position.

It is another object of my present invention to provide a packing ring of heat resisting material and having sealing lips normally yieldingly urged outward or in opposite directions by a single spring ring.

It is another object of my invention to provide a packing ring of the type hereinabove referred to in which the packing material that is heat resistant and deformable to effect a satisfactory seal is separable from or formed separately from the spring ring which normally holds the packing lips in operating position so that these parts can be handled separately and can be removed or replaced separately when desired.

The various objects and features of my invention will be fully understood from the following detailed description of typical preferred forms and applications of the invention, throughout which description reference is made to the accompanying drawings, in which:

Fig. 1 is a side view of a swing joint embodying the present invention, a part of the joint being broken away to show in section. Fig. 2 is an enlarged, detailed sectional view of the packing body that I have provided, showing it in its originally formed shape, that is, in the shape that it takes before being inserted in the joint. Fig. 3 is an enlarged detailed view through the construction that I have provided showing the packing body in place in operating position with the spreader ring in position and the packing body and spreader ring confined in a joint construction. Fig. 4 is a side elevation of a portion of

2 one form of spreader ring that I may use. Fig. 5 is a view taken as indicated by line 5—5 on Fig. 4. Fig. 6 is an enlarged sectional view taken as indicated by line 6—6 on Fig. 5, showing the spreader ring in its normal expanded position. Fig. 7 is a view similar to Fig. 4 showing another form of spreader ring, and Fig. 8 is a view similar to Fig. 6 showing the form of spreader ring illustrated in Fig. 7.

The construction that I have provided by my present invention is applicable, generally, to joints or connections where two parts turn one relative to the other. A typical example of such a situation is a swivel joint such as may involve an L section A and a nipple section B in which the nipple is joined to one end of the L to rotate relative thereto. In the drawings I have shown such a construction and have shown the L section with a fluid passage 10 through it and with an enlarged end 11 having a socket 12 that receives the inner end portion 13 of the nipple. The outer end portion 15 of the nipple projects beyond the enlarged end of the L section and is provided with means for making connection with a conduit such as a pipe, or the like. In the particular case illustrated the outer end of the nipple has an internally threaded portion 16 to receive a pipe or like element. An opening or fluid passage 17 is formed through the nipple and preferably corresponds in size to the opening 10 through the L section.

In accordance with the construction that I have provided an annular space substantially square in cross-section is provided where the elements or sections A and B come together to carry the packing which I have provided. In the preferred form of the invention the inner end portion 18 of the socket 12 is in the form of a bore parallel with the axis of the socket and the bottom 19 of the socket is flat and normal to the bore 18. The inner end 20 of the nipple is flat and parallel to the bottom 19 of the socket and is spaced a substantial distance therefrom so that the packing is carried between these parts. In the preferred construction an annular protective flange 21 continues inward from the inner end 20 of the nipple to overlie the packing and to closely approach the bottom 19 of the socket, as clearly shown in Fig. 1 of the drawings.

In the particular joint construction that I have illustrated two series of balls 25 are carried in registering grooves 26 in the sections A and B so that the nipple is rotatably retained in the socket of the L section. A sealing ring 30 is carried by the nipple outward of the retaining balls 25 and serves to bear outwardly against the wall of the socket 12 to prevent dust or foreign matter from getting into the joint and to retain lubricant that may be introduced to the region where the balls 25 operate. The particular sealing construction shown in the drawings is more fully set forth and is claimed in my co-pending application entitled "Seal for Swivel Joints" filed on even date herewith, Serial No. 632,567.

The packing ring that I have provided involves, generally, two parts, one a body 40 of packing material and the other a spreader ring 41 which acts in the body 40 to actuate its sealing parts. In accordance with my invention I form the body 40 of a mixture of composition of material that will effectively resist heat and temperature changes such as occur when steam or like hot fluids is being handled. In practice I may use various materials in the formation of the body 40. However, I prefer in practice to form the body primarily of asbestos or the like, and I have found it advantageous to form it of a mixture of asbestos and neoprene or polychloroprene in which the asbestos is the principal element involved while the neoprene serves as a binder to hold the asbestos in a solid body. By thus forming the body 40 of the packing of asbestos or the like bound by a material such as neoprene it is possible to mold or form it into any desired shape and it is preferred, when employing the joint construction that I have set forth, to mold it in the form of a continuous annular part or ring so that it is free of joints that might lead to leakage.

The body 40 in its preferred form has an outer or ring portion 43 which has a flat or smooth outer side or periphery 44 and flat ends 45. In addition to the ring portion 43 the body 40 has inwardly projecting annular side flanges 46, the outer end portions 47 of which form sealing lips and have flat surfaces 48 adapted to bear or seat against flat parts such as the bottom 19 of the socket or the end 20 of the nipple. The outer sides 50 of the projecting flanges 46 inward of the flat surfaces 48 are recessed or made concave and by this construction the flanges are allowed to readily compress from the position shown in Fig. 2 to the position shown in Fig. 3, and to be effectively pressed as by the spreader ring 41, as will be hereinafter described.

The packing body 40 may be uniform in character or texture throughout or it may have rings or sections 51 of reinforcing material embedded or incorporated in it, as circumstances may require. By incorporating reinforcing rings 51 formed of metal wire in the body in the manner such as is shown in Figs. 2 and 3 of the drawings, the body is effectively held against distortion from its desired shape. In practice I proportion the body 40 of packing so that the peripheral surface 44 thereof slidably fits into the bore 18 of the socket 12, while the side walls 45 fit snugly against the bottom 19 and end 20 of the socket and nipple, respectively.

The inner sides of the flanges 46 may be flat at 60 where they are opposite the parts 48 and as they progress inwardly they are curved or made concave, as at 61, so that they finally join to form one continuous concave surface formed about a single or common center X.

The spreader ring 41 is a metal ring formed of a material having the desired resilience and which is such as to be resistant to the fluid being handled by the packing. For ordinary use, as for instance where the joint is being used to handle steam, it is practical to form the spreader ring 41 of a material such as suitably tempered Phosphor bronze. The spreader ring 41 may be formed as a continuous ring or as a split ring, as circumstances require, and it is preferably formed of a sheet of material which sheet has been suitably pressed or formed to give the ring the shape and characteristics that I am about to describe. In the case of the spreader ring shown in Figs. 3, 4, 5 and 6 of the drawings there is a continuous annular rim or web 70, the outer surface 71 of which is convex and curved to seat against the concave surface provided by the inner sides 61 of the flanges 46. In addition to the web 70 the spreader ring has side flanges 72 which project inwardly from the web and are preferably normally divergent as clearly shown in Fig. 6 of the drawings. In the particular form of ring under consideration the flanges 72 are interrupted by a plurality of notches or openings 73 so that they are not continuous but, rather, are, in effect, a plurality of individual parts free to flex individually. In the normal position and before being arranged in operating position in the joint, the flanges 72 are apart, but as the structure is assembled the ring is applied to the packing body 40 between the flanges 46 to press the flanges 46 outwardly and when the joint is finally assembled the end or longitudinal pressure applied to bring the nipple into position in the socket so the balls can be inserted in the grooves causes the flanges 46 to be moved in and the flanges 46 in turn depress or move the flanges 72 in to a position substantially as shown in Fig. 3 of the drawings. Because of the resilience of the spreader ring the flanges 72 normally tend to expand or bear outwardly and thus force the flanges 46 out or apart and into suitable pressure engagement with the bottom 19 and end 20 of the socket and nipple, respectively. By suitably forming, shaping and proportioning the spreader ring 41 I am able to gain the desired sealing engagement or pressure engagement between the flanges 46 and the parts to be sealed. Further, it is to be noted that I do not, with the construction that I have just described, depend upon the inherent resiliency or life of the packing body 40 to maintain a pressure-tight connection, but I rely upon the spreader ring 41 to press the packing material outward, the packing material being somewhat deformable so that it shapes itself or conforms to the surfaces against which it is pressed by the spreader ring.

In the particular form of spreader ring shown in the drawings one flange of the ring is made longer or projects further inward than the other to engage the extension 21 of the nipple and through this engagement the spreader ring is kept centralized and the packing 40 is effectively held out or expanded so that it remains seated in the bore 18 of the socket.

In the form of the invention shown in Figs. 7 and 8 the spreader ring 41ª is substantially the same as I have just described, except that the side flanges 72ª, instead of being interrupted by notches or openings, are continuous. This construction is somewhat more simple than that above described and it may be employed when it is desired to make a ring that will exert a substantial amount of pressure against the flanges of the packing, since a relatively strong or stiff spreader ring can be made in this manner.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. In combination two tubular elements coupled in aligned relation for relative rotation about an axis longitudinal of the elements, one of the elements having a socket entering it from one end, the socket having a flat bottom in a plane normal to the said axis and the other element having a nipple entering the socket and having a flat end face parallel with and spaced from the bottom axially of said element, an annular packing body between the bottom and end face with flexible flanges extending radially inward and engaging the bottom and the end face, and a resilient spreader ring engaging the packing body between the flanges spreading the flanges apart axially of said elements and into pressure engagement with both the bottom and end, the spreader ring engaging one of said elements and being supported thereby concentrically of said axis.

2. In combination, two tubular elements coupled in aligned relation for relative rotation about an axis longitudinal of the element, one of the elements having a socket entering it from one end, the socket having a flat bottom, in a plane normal to the said axis and the other element having a nipple entering the socket and having a flat end face parallel with and spaced from the bottom axially of said elements, an axial tubular flange projecting from the said face at the inner periphery thereof and toward the bottom, an annular packing body around said flange and between the bottom and end face with flexible flanges extending radially inward and engaging the bottom and the end face, and a resilient spreader ring engaging the packing body between the flanges spreading the flanges apart axially of said elements and into pressure engagement with both the bottom and end, the spreader ring engaging the flange and being supported thereby concentrically of said axis.

3. In combination, two tubular elements coupled in aligned relation for relative rotation about an axis longitudinal of the element, one of the elements having a socket entering it from one end, the socket having a flat bottom in a plane normal to the said axis and the other element having a nipple entering the socket and having a flat end face parallel with and spaced from the bottom axially of said elements, an axial tubular flange projecting from the said face at the inner periphery thereof and toward the bottom, an annular packing body around said flange and between the bottom and end faces with flexible flanges extending radially inward and engaging the bottom and the end face, and a resilient spreader ring having spaced parts bearing on the inner sides of the packing body, one of said spaced parts engaging the exterior of the said axial flange whereby the spreader ring is supported concentrically therewith.

4. A packing ring including an annular body formed of packing material, the body having a ring portion and axially spaced flanges projecting radially inward from the ring portion at the ends thereof and having flat outer sealing surfaces, and a resilient metal spreader ring within the ring portion and between the flanges, the spreader ring having flange portions projecting radially inward from the ring portion and engaging and bearing outwardly against the inner sides of the flanges of the body, one flange portion of the spreader ring being of greater extent radially of the ring than the other and projecting radially inward from the body.

5. In combination, two tubular elements coupled in aligned relation for relative rotation about an axis longitudinal of the element, one of the elements having a socket entering it from one end, the socket having a flat bottom in a plane normal to the said axis and the other element having a nipple entering the socket and having a flat end face parallel with and spaced from the bottom axially of said elements, an axial tubular flange projecting from the said face at the inner periphery thereof and toward the bottom, an annular packing body around said flange and between the bottom and end face with flexible flanges extending radially inward and engaging the bottom and the end face, and a resilient spreader ring engaging the packing body between the flanges spreading the flanges apart axially of said elements and into pressure engagement with both the bottom and end, the spreader ring having an annular part conforming to the interior of the packing body between the flanges thereof and having side flanges projecting radially inward from such annular part and engaged with the inner sides of the flanges of the packing body, one of the said side flanges of the spreader being of greater radial extent than the other and projecting radially inward from the inner periphery of the flange of the body with which it is engaged and engaging the exterior of the said axial tubular flange to be supported thereby and concentrically therewith.

DOYLE C. WARREN.

REFERENCES CITED

The following references are of record in the file of this patent:

UNITED STATES PATENTS

| Number | Name | Date |
|---|---|---|
| 917,690 | Weese | Apr. 6, 1909 |
| 1,363,565 | Christenson | Dec. 28, 1920 |
| 1,808,262 | Heleshaw | June 2, 1931 |
| 1,871,299 | Bragg et al. | Aug. 9, 1933 |
| 1,931,922 | Damsel et al. | Oct. 24, 1933 |
| 1,958,120 | Tuxbury et al. | May 8, 1934 |
| 1,989,980 | Hamer | Feb. 5, 1935 |
| 2,052,603 | Christenson | Sept. 1, 1936 |
| 2,076,716 | Fretter | Apr. 13, 1937 |
| 2,088,703 | Hubbard et al. | Aug. 3, 1937 |
| 2,162,104 | Mosher | June 13, 1939 |
| 2,165,052 | Hering | July 4, 1939 |
| 2,301,097 | Tweedale | Nov. 3, 1942 |
| 2,382,375 | Allen et al. | Aug. 14, 1945 |